United States Patent
Moody et al.

(10) Patent No.: US 7,256,681 B1
(45) Date of Patent: Aug. 14, 2007

(54) ASSET TRACKING USING WIRELESS LAN INFRASTRUCTURE

(75) Inventors: John O. Moody, Vestal, NY (US); Eric R. Steinbrecher, Binghamton, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 454 days.

(21) Appl. No.: 09/692,538

(22) Filed: Oct. 20, 2000

(51) Int. Cl.
*H04Q 5/22* (2006.01)
*G01S 3/02* (2006.01)

(52) U.S. Cl. .................. 340/10.1; 340/10.3; 340/10.4; 342/457

(58) Field of Classification Search ............... 340/10.1, 340/10.3, 10.32, 10.42, 10.51, 10.52, 572.1, 340/825.69, 10.4; 370/331, 352, 347, 412, 370/85.7; 455/524; 600/300; 709/224, 709/225; 128/903, 630, 904
See application file for complete search history.

(56) References Cited

U.S. PATENT DOCUMENTS

| | | | |
|---|---|---|---|
| 5,363,425 A * | 11/1994 | Mufti et al. ................... | 379/38 |
| 5,574,665 A | 11/1996 | Narasimhan | |
| 5,621,417 A | 4/1997 | Hassan et al. | |
| 5,640,002 A | 6/1997 | Ruppert et al. | |
| 5,691,980 A | 11/1997 | Welles, II et al. | |
| 5,749,367 A * | 5/1998 | Gamlyn et al. ............. | 128/696 |
| 5,835,061 A * | 11/1998 | Stewart ....................... | 342/457 |
| 5,850,187 A | 12/1998 | Carrender et al. | |
| 5,944,659 A * | 8/1999 | Flach et al. .................. | 600/300 |
| 5,952,922 A | 9/1999 | Shober | |
| 6,101,399 A * | 8/2000 | Raleigh et al. ............. | 455/561 |
| 6,127,928 A * | 10/2000 | Issacman et al. ......... | 340/572.1 |
| 6,177,860 B1 * | 1/2001 | Cromer et al. ............. | 340/10.1 |
| 6,362,738 B1 * | 3/2002 | Vega ........................ | 340/572.1 |
| 6,400,272 B1 * | 6/2002 | Holtzman et al. ........ | 340/572.1 |
| 6,463,272 B1 * | 10/2002 | Wallace et al. ............. | 455/404 |
| 6,483,427 B1 * | 11/2002 | Werb ......................... | 340/10.1 |
| 6,496,499 B1 * | 12/2002 | Hamilton et al. ........... | 370/348 |
| 6,509,828 B2 * | 1/2003 | Bolavage et al. ........... | 340/10.1 |
| 6,513,015 B2 * | 1/2003 | Ogasawara .................... | 705/26 |
| 6,587,034 B1 * | 7/2003 | Heiman et al. ............. | 340/7.55 |
| 6,587,479 B1 * | 7/2003 | Bianchi et al. .............. | 370/487 |
| 6,659,947 B1 * | 12/2003 | Carter et al. ................. | 600/300 |
| 6,701,361 B1 * | 3/2004 | Meier ......................... | 709/224 |
| 6,876,295 B1 * | 4/2005 | Lewis ....................... | 340/10.34 |

* cited by examiner

*Primary Examiner*—Brian Zimmerman
*Assistant Examiner*—Nam Nguyen
(74) *Attorney, Agent, or Firm*—Whitham, Curtis, Christofferson & Cook, PC

(57) ABSTRACT

Transponders capable of providing identification information and possibly additional information are detected from wireless access points of a computer network as a substitute for closed radio frequency identification (RFID) systems while providing numerous additional functionalities and applications. Total asset visibility or responses to more limited queries are provided by inclusion of a geographic information system software application. Location reporting of proximity of devices/transponders to access points can be enhanced to a fine-grained level by triangulation or other algorithms including neural networks.

9 Claims, 2 Drawing Sheets

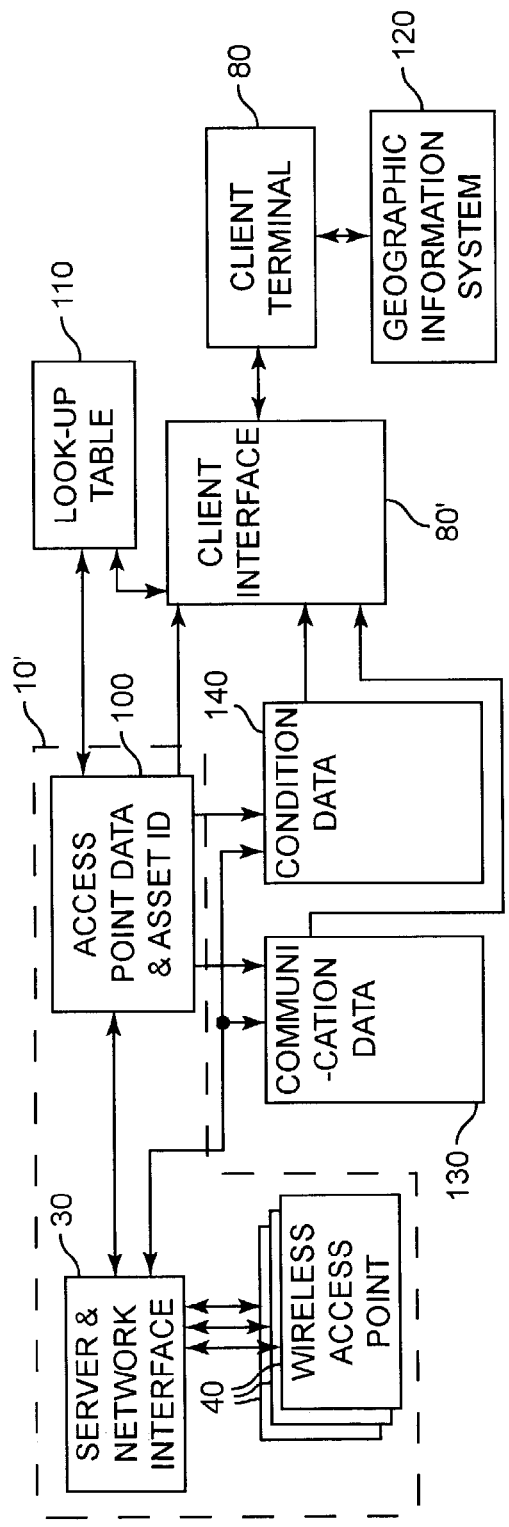
*Figure 2*
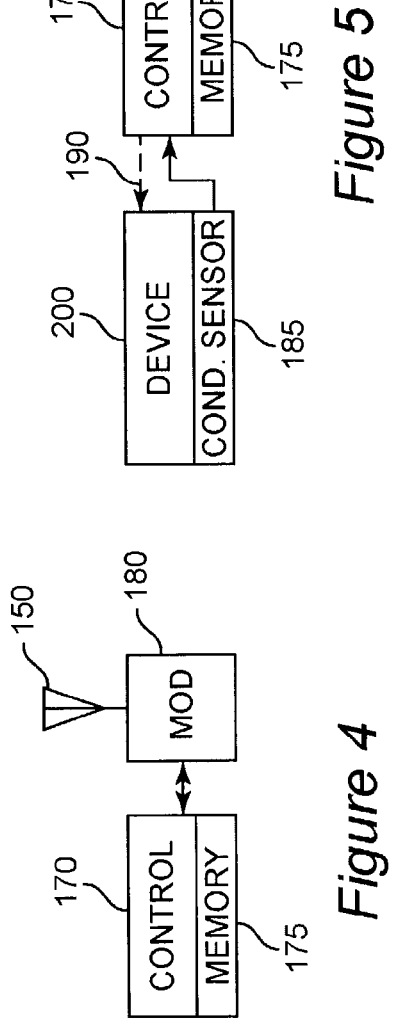
*Figure 5*
*Figure 4*
*Figure 3*

ASSET TRACKING USING WIRELESS LAN INFRASTRUCTURE

BACKGROUND OF THE INVENTION

1. Field of the Invention

The present invention generally relates to the tracking of movement of people and objects using wireless communication links and, more particularly, to combined tracking of and communication with people and objects using a widely available and well-developed communications medium.

2. Description of the Prior Art

Radio Frequency Identification (RFID) systems have been known for a number of years, particularly in the field of theft deterrence. Many retail establishments now mark goods with a removable tag or include a permanent device in or on the goods which can be deactivated by a magnetic field or other arrangement. Tags which have not been deactivated or removed are then detected at some point of egress from the store by radio frequency interrogators positioned to detect active tags brought into proximity therewith.

RFID systems are not at all limited to theft deterrence and may be used for a wide variety of applications ranging from, for example, inventory control to secure location access control to global supply chain problems. Any object, animal or person with which a detectable tag can be physically associated can be tracked and its location reported to any desired level of accuracy or resolution with a suitably designed RFID system. Depending on the application, the tags may be active or passive (e.g. powered or unpowered) and may or may not have the capability of being separately identifiable, either uniquely or in groups/categories, or other capabilities. Radio interrogators may also be of widely varying configurations, depending on the intended application.

Unfortunately, current RFID systems are generally custom designed for particular application and/or rely on proprietary, dedicated hardware. Therefore, such systems can be expanded or modified only with substantial difficulty and cannot be adapted for any other data intensive application. Further, in general, RFID products from different vendors are not interoperable and, moreover, may interfere with or have their performance degraded by other radio frequency applications, including other RFID systems, used in the same environment. The geographic scope of the RFID system is generally fixed with the system design and, in general, the detectable range of tags from radio interrogators is very limited, often to a few feet or meters.

Local area and wide area networks are known for providing communications between data processing devices such as personal computers to allow them, for example, to access a common data base. Such networks may be hardwired or wireless or a combination thereof. Wireless portions of a local or wide area network communicate with individual terminals through radio frequency transmitters and receivers which are spatially separated and generally referred to as access points. The network has the capability of tracking the particular terminals with which communications can be conducted from a given access point at any given time.

It should be recognized that RFID systems can interfere with wireless portions of local and wide area networks and other radio frequency systems and vice-versa. That is, for example, a RFID system may preclude use of a wireless portion of a LAN or WAN (hereinafter collectively referred to as networks) in certain locations of a facility. Further, the detectable tag of an RFID system may compromise other devices or arrangements that rely on radio frequency communications, particularly compromising reliable communications between terminals and access points of a network.

It should also be recognized that while RFID systems and wireless portions of networks are similar enough in some ways to interfere with each other, the proprietary nature of the former and the intended function of the latter does not permit combined functions to be realized. For example, while a wireless portion of a network may have a rudimentary capability to track and/or switch the access point for communication with a particular terminal, it cannot generally report the location of the assets that such terminals or particular operators which particular terminals may represent, much less track assets represented by equipment connected to a given terminal which may communicate with a central server or other terminals through a wireless portion of a network. Conversely, RFID systems cannot provide data communications using standard wireless data networking protocols, such as IEEE 802.11. Special purpose transmitter/receiver devices, known as interrogators, are equipped to merely sense the proximity of identifiable tags or to engage in limited read/write data traffic with the tags using protocols that preclude the inclusion of other network-aware devices participating in the communication.

SUMMARY OF THE INVENTION

It is therefore an object of the present invention to provide a RFID system for asset tracking which is extendable and utilizes a standardized, non-proprietary communication protocol.

It is another object of the invention to provide asset tracking and reporting capabilities automatically over a generalized and extensible infrastructure.

It is a further object of the invention to provide combined asset tracking and reporting in a particularly enhanced form together and in combination with a capability for arbitrary and generalized data communications between tracked assets.

In order to accomplish these and other objects of the invention, a transponder is provided including an arrangement for associating said transponder with a device, a communication facility for associating the transponder with access points of a standard wireless data network, including receiving an interrogation signal, and transmitting a signal that can be interpreted by an access point of the standard wireless data network as identification information.

In accordance with another aspect of the invention, an asset tracking system is provided including a computer network supporting a plurality of wireless links from respective wireless access points, a transponder including an arrangement for transmitting identification information to the network, and an arrangement for accessing and reporting internal network access point information in association with identification information.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is a schematic block diagram of the data processing architecture of a preferred, exemplary form of the invention, and FIGS. 3, 4 and 5 are schematic diagrams of exemplary types of devices of differing functionality which may be tracked in accordance with the invention.

DETAILED DESCRIPTION OF A PREFERRED EMBODIMENT OF THE INVENTION

Figure 1:
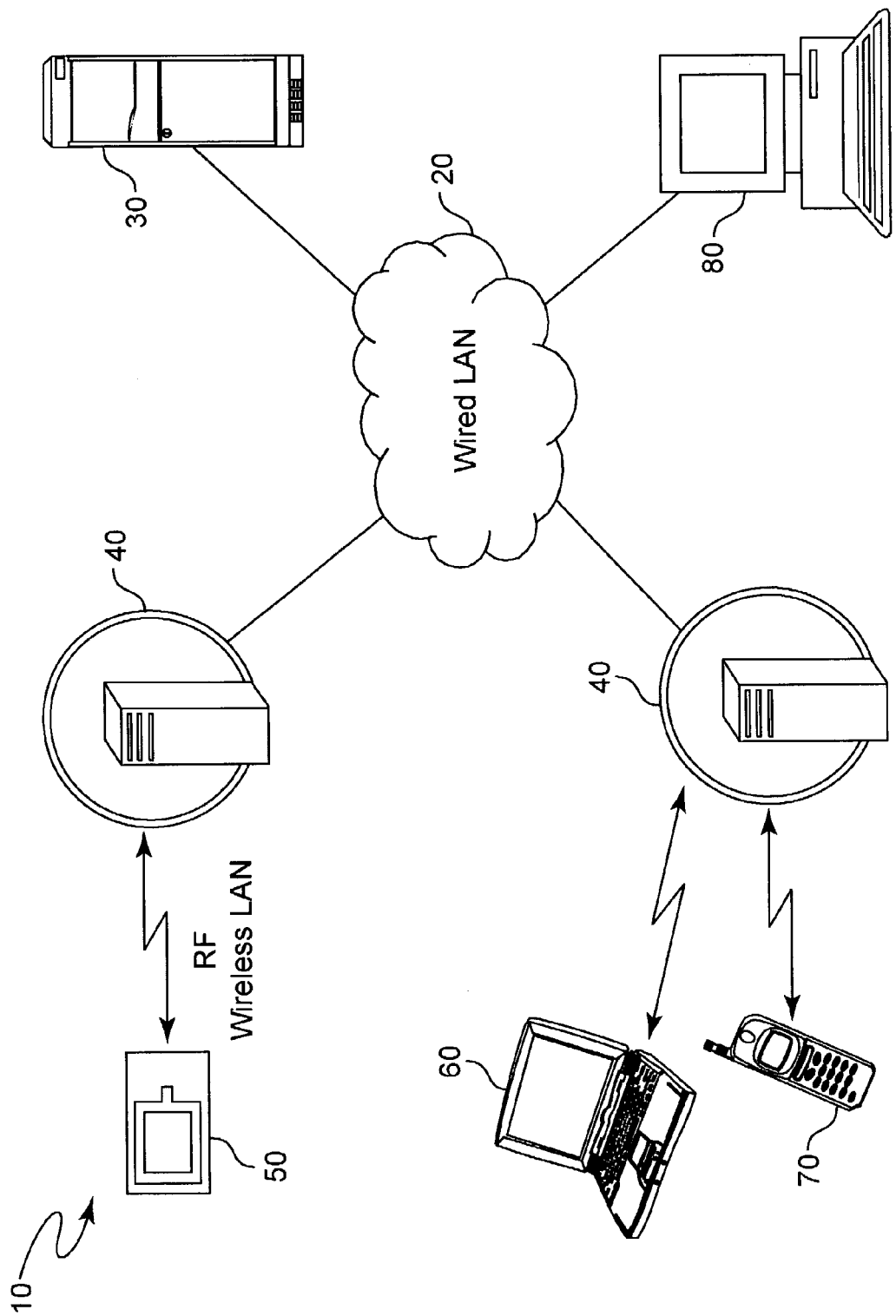
FIG. 1 is a high-level schematic diagram of the architecture of a system in accordance with the invention.

Referring now to the drawings, and more particularly to FIG. 1, there is shown a high-level schematic diagram of the physical architecture of an exemplary system 10 in accordance with the invention. Central to this system architecture is a wired network of arbitrary extent, the details of which are unimportant to the practice of the invention. Associated with the wired network 20 is a server/controller 30 which is suitably programmed to provide polling or querying of wireless network access points with a simple network management protocol (SNMP), wireless network management protocol (WNMP) or the like as well as database management and client communications applications.

These queries may serve the simple purpose of determining which devices are associated with which access points, which can then be mapped to physical locations based on proximity. It is preferred that the system feed data from the queries to an algorithm that will provide higher resolution positioning or proximity to access points. Many techniques can be used for this purpose, including triangulation, quadratic optimization, or neural networks. The use of algorithms such as quadratic optimization or a neural network require that the system have access to data collected from a site survey where the radio frequency (RF) characteristics of the physical environment are measured and recorded. This site survey data is then matched with data from real-time queries of devices on the network by the above-mentioned algorithms to narrow down the location of the device to a physical location within the environment. Conducting site surveys is a standard step in the installation of a wireless data network and will be familiar to those skilled in the art.

Wireless access points 40 are also well-known for allowing communications with processors (e.g. 60) which are not hard wired to the network. Each wireless access point 40 includes a transmitter and receiver preferably capable of communicating over a plurality of channels (e.g. using different frequencies, different code packet addresses or the like) simultaneously. Each communication to or from a processor includes identification of the processor and, when a communication is received from a processor 60 and communicated to server 30, the access point is identified, as well, so that server 30 can continue to communicate bidirectionally with processor 60 through a particular access point until a communication is received through a different access point.

It should be appreciated that the functions of polling or querying of access points and processors communicating therethrough and tracking the access point used for communication with each processor 60 is a known and necessary management function of a network including wireless network links. The invention leverages this function by providing communication to and from additional devices 50, 70 (e.g. tags, smart cards, portable telephones and the like) with varying functionalities and providing a query interface and suitable reporting software to present management data and other data which may be collected in association with management data to a user, schematically depicted as client 80, or any other terminal associated with the system over hard wired or wireless links.

That is, referring to FIG. 2, known networks having wireless communications capability will include the structure and resources indicated by dashed line 10'. The server 30 will include, as existing infrastructure, a network communications interface which can direct communications to and receive communications from a plurality of wireless access points 40 and includes storage 100 to maintain association of a particular processor with a particular wireless access point 40 and communication channel supported thereby. Such systems are generally expandable, at will, and generally interoperable and are thus referred to as "open" whereas RFID systems generally do not interoperate wirelessly with other RFID systems or wireless data network-aware devices and are thus referred to as "closed".

The invention leverages the existing infrastructure of wireless networks by preferably providing storage of information concerning generalized assets which are made visible to the network by physical association with a transceiver which is capable of at least rudimentary communications, such as returning a short sequence of code (or a frequency which can be converted to a code at an access point) such as a serial number or other identification when polled by the network over a wireless link. Storage of such information in, for example, look-up table 110, is not necessary to the practice of the invention but is much preferred to simplify and shorten communications and to reduce complexity of the transceiver.

For example, the serial number of an automobile can convey a substantial amount of information about its original equipment in a relatively few digits which can be rapidly transmitted and processed. It is preferred that the identifying code transmitted by (or in response to) an asset be or include the machine address of its wireless networking hardware (160 and 180 in FIGS. 3-5). Look-up table 110 can also provide decoding of other information which can be coded in very few bytes into plain text, as will be further discussed below.

In current wireless networks, data associating access points with particular devices is generally stored only on the access points themselves. In accordance with the present invention, network queries to the access points are used to create a general data store 100 of access point/wireless device associations and metrics, such as the strength of radio signals between access points and the devices. The invention operates on this data by making it accessible to a client terminal 80 through a client interface 80'. This data is formatted and organized for display, preferably in accordance with specific client queries, by a geographic information system (GIS) resident on or downloadable from the server to the client terminal. Such systems are generally known for geolocation and map-following applications and can be readily adapted for any particular environment such as a building, a plurality of business sites, a map of a region and the like.

As perfecting features of the invention, storage 130, 140 can be provided for other types of information such as communicated messages from a user of a processor 60 or condition data such as an on-hook or off-hook condition of a portable telephone 70 or contents of a smart card 50. These storage arrangements may be considered as extensions of look-up table 110 and may be provided most readily by configuration of the server. It should be appreciated that storage of communications from a network connected processor will generally exist in a network server but is separately depicted at 130 since communicated data may be somewhat more generalized in the context of the invention.

In view of the foregoing, it should be appreciated that virtually all hardware depicted in FIG. 2 is provided by the infrastructure of a network including wireless links. Thus, by providing GIS software to access and report access point information enhanced by additional asset information and, preferably, by fine grained location arrangements and providing visibility of additional types of assets to the wireless links of the network, numerous additional and valuable functions are provided at minimal cost while overcoming the closed nature of known RFID systems. The additional functionalities provided by the present invention will become evident from the following discussion of the arrangements by which additional assets are made visible to the network. Other functionalities and applications of the invention will become evident to those skilled in the art from the following discussion, as well.

FIG. 3 represents the simplest form of an arrangement which can be made visible to the network and is preferably embodied as a tag which may be physically associated with a generalized asset. Essentially such a tag, which may be attached to an article/asset of interest in any manner, such as with adhesive in the manner of a label, comprises an antenna 150 and some circuit elements 160 which will provide a response using standard wireless networking protocols when an interrogation signal is received from the network. The tag can be either active (e.g. including its own power supply) or passive (e.g. using a resonant circuit to re-radiate received energy at a different frequency) which can be detected by the network.

Because of the processing power required by the tag to respond with appropriate communication protocols, current implementations providing such a response must be active. Such rudimentary responses can be converted to code in accordance with network protocols by a suitable converter at the access points. Different re-radiation frequencies can be used to distinguish different types of tags to identify different assets and corresponding codes generated. However, such a converter would represent a hardware modification of the network (but allow somewhat less expensive transponders) whereas no hardware modifications of the network are necessary and the invention can be entirely implemented in software if active transducers are provided.

This type of tag provides a function identical to known RFID systems such as inventory control and access authorization but through an open and expandable wireless network. However, different types of articles may be distinguished by the return signals and a description thereof and/or other pertinent information retrieved from look-up table 100. Additional functionality can be achieved through the GIS arrangement for reporting location and may be enhanced by fine-grained location detection arrangements as may be desired.

A more flexible arrangement with additional functionality can be achieved through a tag in accordance with FIG. 4. In this case, the tag is substantially in the form of a "smart card" familiar to those skilled in the art. Essentially, such a tag includes a control section 170 and a memory 175. The contents of the memory can be changed at will by various known mechanisms. This function can then be used to provide an identification of the article/asset to which the tag is attached or otherwise physically associated. However, for purposes of the invention, it may be preferable to have a section of memory which is arranged to be read-only or otherwise protected from change for containing the article/asset identification and the alterable remainder of the memory used for article condition information, such as maintenance records.

When an interrogation signal is received from the network, the control section causes a read out of the memory contents to a modulator 180 which then transmits preferably coded signals to the network. Asset identification and other pertinent information including plain text translation of changeable (e.g. condition) information retrieved from look-up table 100 and/or condition data memory 130. Condition data is preferably stored and may be reflected in the display provided at the client terminal. Such data will, of course be updated at the next interrogation and response if the data in memory 175 has been changed.

The type of "smart card" tag illustrated in FIG. 4 provides a generalized structure that can provide a particularly fine-grained identification of many different assets such as individual personnel or equipment identification over large numbers of large populations of assets. This functionality is particularly useful for inventory control and so-called "just-in-time" supply strategies, manufacturing process monitoring, and personnel location such as, in a health care operation environment, the monitoring of location of particular doctors and nurses and patients, as well. Patient condition and other information such as records of administration of medication can also be monitored with the arrangement of FIG. 4. Further, the location of equipment and files or other records can be tracked and actions taken thereon (such as maintenance or usage) reported globally or in the context of particular queries.

Additional functionality and potential applications are available from the arrangement illustrated in FIG. 5. This arrangement is similar to that of FIG. 4 but additionally includes condition sensing (e.g. 185) and/or remote device control from the network. It is contemplated that this type of arrangement should be integrated with the associated device 200, such as portable telephone 70 configured to operate over a wireless network, using, for example, the voice-over-IP protocol. Thus usage or any other detectable condition can be monitored directly and in substantially real-time. Transmission from modulator 180 can be initiated by interrogation signals from the network and/or upon change in any monitored condition. In the context of telephony, the bidirectional voice message can be recorded on the network or additional functions provided such as recording a message on the network for later transmission such as upon the occurrence of a busy signal or when it is desired to transmit a message at a particular time. The functionality of the arrangement of FIG. 5 is also particularly useful in the context of a medical treatment environment since location reporting can be limited to assets which are not currently in use.

Control from the network is schematically depicted by dashed arrows 190. This control may take the form of remote control of machinery and may include automatic control based on location as widely divergent vehicle speed control in particular geographical regions and context sensitive computing where the processor behavior is changed in dependence on the environment. Similarly, the environment may include other assets visible to the network, allowing, for example, processor response to be automatically altered for different individual users who are also visible to the system.

It should be appreciated that the asset tracking system in accordance with the invention provides total asset visibility to support automation of logistics in military and commercial supply chains. Mobile vehicles such as automobiles, trucks, railroad rolling stock, boats and airplanes can also be tracked and a range of services based on usage, such as automated fueling, automatically scheduled and/or provided. Other moveable items such as postal bins and their contents can be tracked and managed in much the same fashion. Portable computers and other data capture devices can be tracked and data downloaded automatically while usage and users can be monitored. The system can also be applied to theft detection and prevention, access control or even electronic home arrest in a manner which can be readily expanded in scope and/or easily customized to any particular environment or change thereof.

In view of the foregoing, it is seen that the use of active or passive tags which are visible to a computer network having wireless links provides a substitute for RFID systems that overcomes the disadvantages of the closed nature of such systems and provide two primary functions of general data networking and physical location sensing using the same infrastructure. Further, the system in accordance with the invention provides numerous additional and valuable functionalities well beyond those provided by RFID systems. The invention may be easily implemented with well-understood and reliable hardware from a mature technology and at little cost if a network supporting wireless links is already in place or otherwise needed for its usual functions. Additionally, the use of a transmission control protocol/internet protocol (TCP/IP) makes many data interactions readily available which are impossible or prohibitively difficult to implement in an RFID system.

While the invention has been described in terms of a single preferred embodiment, those skilled in the art will recognize that the invention can be practiced with modification within the spirit and scope of the appended claims.

The invention claimed is:

1. An asset tracking system including
   a computer network supporting a plurality of wireless links from respective wireless access points of said computer network,
   a transponder detectable by said wireless access points of said computer network, said transponder including means for transmitting identification information corresponding to said transponder in accordance with a wireless network protocol in response to an interrogation signal from one of the wireless access points of said computer network whereby a wireless access point/wireless device association for said transponder is created and stored in one of said computer network and said transponder,
   means for resolving location of said transponder based on signals communicating said identification information to wireless access points of said computer network, and
   means for accessing and reporting through said computer network internal network wireless access point/wireless device associations including said wireless access point/wireless device association for said transponder from said wireless access points, said means for accessing and reporting internal access point/wireless device associations including a geographic information system resident on or downloadable to a terminal of said computer network.

2. A system as recited in claim 1, further including
   means for associating internal network access point information with geographical locations.

3. A system as recited in claim 2, further including
   means for reporting identification information associated with geographical locations to a user of said computer network.

4. A system as recited in claim 1, further including
   means for determining proximity of said transponder to an access point.

5. A system as recited in claim 4, wherein said means for determining proximity includes triangulation means.

6. A system as recited in claim 4, wherein said means for determining proximity includes quadratic optimization means.

7. A system as recited in claim 4, wherein said means for determining proximity includes a neural network.

8. A system as recited in claim 4, further including
   means for associating internal network access point information with geographical locations.

9. A system as recited in claim 8, further including
   means for reporting identification information associated with geographical locations to a user of said computer network.

* * * * *